(12) United States Patent
Murray

(10) Patent No.: US 8,333,909 B2
(45) Date of Patent: *Dec. 18, 2012

(54) CONDUCTIVE POLYMER, CONDUCTIVE POLYMER COMPOSITIONS AND METHODS FOR THEIR USE

(75) Inventor: Graham Simpson Murray, Hampshire (GB)

(73) Assignee: BAC2 Limited, Eastleigh, Hampshire (GB)

( * ) Notice: Subject to any disclaimer, the term of this patent is extended or adjusted under 35 U.S.C. 154(b) by 309 days.

This patent is subject to a terminal disclaimer.

(21) Appl. No.: 12/641,700

(22) Filed: Dec. 18, 2009

(65) Prior Publication Data

US 2010/0159354 A1 Jun. 24, 2010

Related U.S. Application Data

(63) Continuation-in-part of application No. 10/552,233, filed as application No. PCT/GB2004/001571 on Apr. 8, 2004, now Pat. No. 7,655,159.

(30) Foreign Application Priority Data

Apr. 9, 2003 (GB) .................................. 0308135.3
Dec. 23, 2003 (GB) .................................. 0329836.1

(51) Int. Cl.
| | |
|---|---|
| *H01B 1/00* | (2006.01) |
| *C08G 8/04* | (2006.01) |
| *G21F 1/00* | (2006.01) |
| *H01R 13/64* | (2006.01) |

(52) U.S. Cl. ..... 252/500; 528/129; 528/154; 250/515.1; 439/607.02

(58) Field of Classification Search ............... 250/515.1; 439/607.02; 252/500; 528/129
See application file for complete search history.

(56) References Cited

U.S. PATENT DOCUMENTS

| | | |
|---|---|---|
| 4,626,569 A | 12/1986 | Waitkus et al. |
| 4,753,717 A | 6/1988 | Yata et al. |
| 5,051,454 A * | 9/1991 | Lemon et al. ................. 523/146 |
| 5,214,111 A | 5/1993 | Gerber |
| 5,340,888 A | 8/1994 | Lemon et al. |
| 5,662,833 A | 9/1997 | Laakso et al. |
| 6,544,648 B1 | 4/2003 | Nesbitt et al. |
| 7,262,261 B2 | 8/2007 | Brindopke et al. |
| 2002/0038664 A1 | 4/2002 | Zenko et al. |
| 2003/0147200 A1 | 8/2003 | Harada et al. |

FOREIGN PATENT DOCUMENTS

| | | |
|---|---|---|
| EP | 0 376 432 B1 | 1/1995 |
| JP | 8 151 461 | 8/1996 |
| WO | WO 91/17419 | 11/1991 |
| WO | WO 97/13827 | 4/1997 |
| WO | WO 02/059913 A1 | 8/2002 |
| WO | WO 03/100892 A1 | 12/2003 |

OTHER PUBLICATIONS

Definition of "electrolyte", (http://www.merriam-webster.com/dictionary/electrolyte).*

* cited by examiner

*Primary Examiner* — Mark Kopec
*Assistant Examiner* — Jaison Thomas
(74) *Attorney, Agent, or Firm* — Ice Miller LLP

(57) ABSTRACT

The invention provides an electrolyte comprising an ester-cured alkaline phenolic resole resin containing conducting alkaline salts and methods for the use of the resin.

18 Claims, 8 Drawing Sheets

CONDUCTIVE POLYMER, CONDUCTIVE POLYMER COMPOSITIONS AND METHODS FOR THEIR USE

The present continuation-in-part patent application is related to, and claims the priority benefit of, U.S. patent application Ser. No. 10/552,233, filed, Oct. 7, 2005 and provided an effective 35 U.S.C. §371(c) filing date of Feb. 13, 2006, now U.S. Pat. No. 7,655,159 which is related to, and claims the priority benefit of, International Patent Application No. PCT/GB2004/001571, filed Apr. 8, 2004, which is related to, and claims the priority benefit of, Great Britain Patent Application No. 0308135.3, filed Apr. 9, 2003, and Great Britain Patent Application No. 0329836.1, filed Dec. 23, 2003. The contents of each of these applications are hereby incorporated by reference in their entirety into this disclosure.

The present invention relates to a conductive polymer and conductive polymer electrode compositions and their uses, particularly a polymer bonded carbon electrode.

Electrically conductive polymers and conductive polymer compositions have industrial uses such as electrodes in electrochemical cells, separators, bipolar plates, electromagnetic shields and anti-static products.

Carbon electrode materials are used or have potential use in many electrochemical applications and industrial processes including fuel cells, batteries, energy storage capacitors, catalyst support, corrosion control of metals and concrete, water purification, water sterilisation, desalination, sludge treatment, acid mine drainage treatment, flue gas desulphurisation, soil remediation, metal recovery, electrochemical sensors and electrosynthesis.

Electrochemical water treatment processes are becoming increasingly of interest as they offer benefits over conventional physical, chemical and biological systems. Being electrically driven, rapid reaction rates can be achieved enabling smaller and more efficient plant design. Electrochemical methods replace the need for chemical treatment and biological systems and have been shown to produce other benefits such as a reduction in sludge production and a reduced need to transport hazardous chemicals.

A 2002 report from Water UK states (ENDS report issue 339 Jan. 4, 2003) that water treatment in the UK is becoming more expensive due to the increased quality standards. There is an increase in energy use for both drinking and wastewater treatment. Drinking water now requires 600 kilowatt hours per megaliter to treat and supply—up by 28% since 1998 due to additional treatment and pumping required to meet the cryptosporidium regulations. On the wastewater side, energy use has also escalated from 437 kWh/Ml in 1998 to 598 kWh/Ml—an increase of 37%. The reasons for this are a host of increasing environmental quality requirements obliging companies to install more secondary treatment and ultraviolet disinfection, and processing and disposal of increasing quantities of sewage sludge.

The need for more efficient, lower cost water treatment is clear. Although not widespread, electrochemical water treatment systems have been developed and commercialised. Existing carbon materials used in electrodes are typically graphite, porous carbon, such as carbon felts, aerogels, nanofoams and reticulated vitreous carbon. Graphite is relatively cheap compared to the porous carbon materials but it is a brittle material and requires high temperature machining techniques to achieve the design shape.

Porous carbon electrodes are manufactured from thermosetting resins by a process in which the resin is pre-formed to a certain shape then subjected to high temperatures for extended periods of time until complete carbonisation occurs. The volume of carbon formed is considerably smaller than the original resin size, which leads to reduced product yield. This is a significant problem if specific geometric shapes or sizes are required. This manufacturing technique also has the disadvantages of high material cost and weak material strength due to the "shrinking" of the precursor carbon at high carbonisation temperatures.

High surface area, 3-dimensional carbon electrodes are manufactured using sol-gel technology by carbonising organic compounds. The pyrolysis process produces a vitreous carbon material, which has a high surface area and high electrical conductivity. However, this manufacturing technique includes extremely high manufacturing costs and additional processing would be required to produce a specific geometric shape.

Porous carbon electrodes produced from polymeric binder mixed together with the carbon powders are generally poor conductors. The disadvantage with the use of polymeric binders to form carbon electrodes is that most binders are non-conductive and as a result the conductivity of the electrode deteriorates.

It is clear that the production of a carbon electrode is restricted to low volume manufacturing techniques and that the resulting products are expensive due to either the machining requirements, the processing costs or both.

The production techniques used to manufacture carbon electrodes can be improved and there exists a need for a more efficient, less expensive, more flexible and high volume process to manufacture carbon electrodes.

A solution to these problems has been sought.

According to the invention there is provided an electrical device comprising:
 (a) a negative electrode;
 (b) a positive electrode; and
 (c) an electrolyte means; and optionally
 (d) a separator and/or bipolar plate;
wherein one or more electrode and/or separator or bipolar plate comprises an ester-cured alkaline phenolic resole resin containing conducting alkaline salts and doped with a conducting material.

The bipolar and/or separator plate used in the electrical device according to the invention is preferably a separator plate according to the invention. It will be understood that when the electrical device comprises a bipolar plate, the device does not necessarily comprise a negative electrode (a) and a positive electrode (b). This is because a bipolar plate incorporates negative and positive electrodes.

According to the invention there is provided a separator plate suitable for use in a fuel cell having one or more flow field for directing gas flow wherein the plate comprises an ester-cured alkaline phenolic resole resin containing conducting alkaline salts and doped with a conducting material.

According to the invention there is further provided an electrode comprising an ester-cured alkaline phenolic resin containing conducting alkaline salts and doped with a conducting material.

Cured phenolic resins are thermoset polymers and are superior to all other resin systems with respect to their good thermal and mechanical stability, and their flame resistance. Normally they have good electrical insulating capabilities too. It is therefore surprising that an ester-cured alkaline resole resin is useful as an electrode.

It is known that phenolic resins may be cured under alkaline conditions through reaction with organic esters. Such ester-curing of alkaline phenolic resole resins is described in DE-C No. 1,065,605, DE-C No. 1,171,606, JP-A No.

49-16793 and JP-A No. 50-130627. According to these publications, a highly alkaline phenolic resole resin in aqueous solution may be cured at ambient temperature by reaction with an organic ester by contacting the resin with the ester in the form of a liquid or a gas. Such techniques find use in the bonding of sand in refractory applications such as the production foundry moulds and cores (U.S. Pat. Nos. 4,426,467, 4,68,359 and 4,474,904). This type of process is also described in EP 0 241 156 which uses an aqueous alkaline phenol-formaldehyde resin cured with an ester curing agent to agglomerate wet coal fines followed by the drying and curing of the agglomerates.

Ester-cured alkaline phenolic resole resins have been used in industry for over 20 years. Industrial applications benefit from the rapid room temperature polymerisation reaction. The polymer is unique in that the polymer product contains high levels of electrolytic salts formed in-situ as a by-product of the polymerisation reaction. We have found that the presence of the salts within the polymer result in the polymer having electrical conducting properties much higher than other thermosetting polymers.

We have also found that the conductivity of ester-cured alkaline phenolic resole resins is enhanced by the addition of conductive materials to the polymer composition. Any conductive material can be added to the resin or ester component to impart improved conductivity provided the material is compatible with the polymer components and does not interfere with the curing mechanism. Carbon, particularly in the form of graphite is very compatible with resin and ester components of the polymer system and does not effect the chemistry of the reaction.

The form of carbon preferably selected to improve conductivity is preferably natural or synthetic graphite powder or flake. The main requirements of the carbon is resin compatibility, carbon wettability and conductivity. More than one carbon combination can be used with blends of different carbons such as activated carbon powder, polyacrylonitrile (PAN)-based carbon fibres, pitch-based carbon fibres and carbon black. Carbon combinations with non-carbon conductive fillers such as metal and metal oxide powders and metal coated graphite and glass such as nickel coated graphite and silver coated glass may be used. Alternatively one or more non-carbon conductive fillers may be used on their own.

Non-carbon conductive fillers such as metal and metal oxide powders and metal coated graphite and glass such as nickel coated graphite and silver coated glass that are compatible with the resin and ester components of the conductive mixture and do not inhibit the polymerisation reaction can be used as the conductive filler.

The resin is preferably doped with conducting material in an amount such that the weight ratio of the resin to conducting material is preferably at least 0.001:1, more preferably at least 0.002:1, most preferably at least 1:1 and is preferably at most 100:1, more preferably at most 20:1 and most preferably at most 10:1.

Ester cured alkaline phenolic resoles can be differentiated from acid cured resoles in that the polymer matrix of the cured alkaline phenolic composition contains a high level of alkaline salts. To disperse or dissolve salts of carboxylic acids is very difficult in liquid resoles as the phenolic resin can lose solubility and precipitate from solution. Secondly, acidifying a phenolic resole containing dispersed salts of carboxylic acids will generate $CO_2$ due to the decomposition of the salt on reaction with the acid. It is therefore a unique feature of the cured alkaline resole composition that high quantities of carboxylic acid salts are present in the cured polymer matrix having been formed during the cure reaction.

The advantages of using an ester-cured alkaline phenolic resole resin containing conducting alkaline salts and doped with a conducting material in the invention include that
  the composition can be moulded at room temperature such that the production process is faster, simpler and less costly;
  the composition can be moulded under low and high pressures;
  the resin is of higher conductivity than binders normally used to bind carbon so deterioration in conductivity is minimised;
  the resin is room temperature cured with minimal shrinkage resulting in a more durable product requiring no machining and having good material strength;
  the resin is infinitely water dilutable and as such added water can improve wetting of carbon or graphite powders or flakes to enable high carbon content electrode material to be produced;
  the resin can be foamed to produce a 3-d porous conductive structure with high surface area;
  the resin can be doped with conductive fillers;
  the starting materials are relatively cheap producing cost savings;
  high volume production rates are possible; and
  the reaction is only mildly exothermic permitting large scale bulk products to be formed.

To illustrate the cost saving, the following figures are provided. A commercially available carbon RF [resorcinol-formaldehyde] aerogel material is supplied by Marketech International Inc., in the form of a block, granules, powders and papers. In November 2003, a 100 g quantity of RF aerogel costs US$185 before machining. RF aerogel paper sheets (3.5 inches×10×0.01) cost US$665 per 100 sheets. Carbon aerogels are more expensive with 100 g costing $275 and 100 paper sheets costing $900. In comparison, 100 g of a moulded form of the carbon-doped resin material used in the invention would cost around US$0.42.

For a lower cost electrode material such as graphite and copper the material cost represents only a small part of the total electrode production costs. Graphite and copper require high temperature machining tools to produce precision shapes. Production time, machining time, labour and scrap are all critical to the overall costs. The carbon-doped resin used in the present invention is advantageous because it can be moulded and hardened to a precise shape without machining, reducing labour and scrap.

As a result of the costs savings provided with the electrical device according to the invention, it may be economic to use industrial electrochemical processes that, at present, are not cost competitive with other industrial processes such as water purification techniques for example, chlorination, ozonation and coagulation.

The electrical device according to the invention is preferably a cell, a battery including two or more cells, or a capacitor (especially an electrolytic capacitor). Where the electrical device is a fuel cell, it includes at least one bipolar plate and inlets and outlets to control flow of oxygen and hydrogen through the cell.

A separator according to the invention has a single flow field. It is useful as a current collector, particularly in a fuel cell. A bipolar plate is a flat, gas impermeable, electrically conductive separator between individual fuel cells in a stack. It has a flow field on each side. A flow field is preferably at least one channel machined or moulded into the plate. The flow field is suitable for carrying fuel (usually hydrogen) on one side and an oxidant on the other side from entry and exit points in the fuel cell.

The electrolyte means of the electrical device according to the invention is optionally either in the form of an electrolyte or it is arranged to receive an electrolyte. For example the electrolyte means could be in the form of a conduit through which an electrolyte could flow during operation of the cell or the electrolyte means could be in the form of a container into which an electrolyte could be placed at least during operation of the cell.

The invention also provides use of a carbon-doped ester-cured salt-containing alkaline resole resin as an electrode.

The invention also provides use of a conductive ester-cured salt-containing alkaline resole resin or composition as an electromagnetic shielding material or to prevent electrostatic discharge at a location. Examples of applications for the resin used in the invention as an electromagnetic shielding material include housings for electronic products, such as computers, cash registers, portable phones and other consumer electronics, anti-static packaging materials for use with electronic components or with fine powders, e.g. foods, where there is a risk of dust explosions caused by electrostatic discharge.

The invention further provides a method of suppressing electromagnetic interference in a product which method includes shielding the product with a conductive ester-cured salt-containing alkaline resole resin or composition. The shielding preferably involves providing the product with a housing constructed at least partially from a conductive ester-cured salt-containing alkaline resole resin or composition. The product may be an electrical or electronic product.

The invention also provides a method of preventing electrostatic discharge at a location which method includes providing a conductive ester-cured salt-containing alkaline resole resin or composition or at the location. A suitable location might be a packaging for a fine powder or for an electronic device or component such as a micro chip or a printed circuit board; or the location might be a floor covering, a gas meter part, a water pump seal or a self lubricating bearing; or a workbench or a similar location where devices or components sensitive to electrostatic discharge are manipulated or otherwise worked on.

The conducting material-doped ester-cured salt-containing alkaline phenolic resole resin is preferably a reaction product of an ester curing agent with a phenolic resole and a base. The phenolic resole is preferably a reaction product of a phenol-reactive aldehyde with an alkaline compound of formula

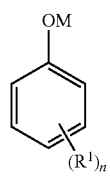
(I)

wherein $R^1$ is a straight or branched chain optionally unsaturated alkyl group containing from 1 to 8 carbon atoms (preferably from 1 to 4 carbon atoms, more preferably from 1 to 2 carbon atoms) optionally substituted by a halogen atom (preferably chlorine) or a hydroxy group, a halogen atom (preferably chlorine), a hydroxy group, and/or a phenyl or benzyl group (optionally substituted by a hydroxy group and/or a straight or branched chain alkyl group containing from 1 to 8 carbon atoms (preferably from 1 to 4 carbon atoms, more preferably from 1 to 2 carbon atoms) optionally substituted by a halogen atom (preferably chlorine) or a hydroxy group);

M is a mixture of hydrogen ions and at least one further cation (preferably the at least one further cation is an alkali metal cation (preferably sodium, lithium or potassium), an alkaline earth metal cation (preferably barium, magnesium or calcium), and/or a $N(R2)4+$ ion (wherein each R2 is the same or different and is hydrogen or a straight or branched chain alkyl group containing from 1 to 4 carbon atoms)) wherein the molar ratio of hydrogen ions to the at least one further cation is sufficient for the pH to be greater than 7 and is preferably from 2:1 to 1:1; and n is from 0 to 2.

Examples of suitable compounds of formula (I) include, but are not restricted to the salt of phenol itself, salts of substituted phenols such as alkylated phenols, halogenated phenols and polyhydric phenols, and hydroxy-substituted poly-nuclear aromatics. Examples of alkylated phenols include methylphenol (also known as cresol), dimethylphenol (also known as xylenol), 2-ethylphenol, pentylphenol and tert-butyl phenol. Examples of halogenated phenols are chlorophenol and bromophenol. Examples of polyhydric phenols include 1,3-benzenediol (also known as resorcinol), 1,2-benzenediol (also known as pyrocatechol), 1,4-benzenediol (also known as hydroquinone), 1,2,3-benzenetriol (also known as pyrogallol), 1,3,5-benzenetriol and 4-tert-butyl-1,2-benzenediol (also known as tert-butyl catechol). Examples of hydroxy-substituted poly-nuclear aromatics include 4,4'-isopropylidenebisphenol (also known as bisphenol A), 4,4' methylidenebisphenol (also known as bisphenol F) and naphthol.

Salts of compounds formed by the condensation reaction of two or more compounds of formula (I) with one or more molecules of a phenol-reactive aldehyde are suitable for use in the ester-cured alkaline resole resin. Examples include, but are not limited to, resinous reaction products of phenol itself, salts of substituted phenols such as alkylated phenols, halogenated phenols and multi-hydroxy phenols, and hydroxy-substituted multi-ring aromatics. Furthermore, mixtures of aldehyde-reactive phenols, such as those obtained from coal tar fractionation, depolymerised lignin and cashew nut shell liquid, can be employed as all or part of the resole component.

The phenol-reactive aldehyde used to react with the compound of formula (I) to form an alkaline phenolic resole is preferably a compound of formula

RCHO (II)

wherein R represents a hydrogen atom or a straight or branched chain alkyl group having from 1 to 8 (preferably from 1 to 4, more preferably from 1 to 2, most preferably 1) carbon atoms; or a precursor of a compound of formula (II).

Examples of suitable aldehydes include formaldehyde, acetaldehyde, propionaldehyde, n-butylaldehyde, n-valeraldehyde, caproaldehyde. Compounds suitable for use as precursors for a compound of formula (II) include compounds that decompose to formaldehyde such as paraformaldehyde, trioxane, furfural, hexamethylenetriamine, acetals that liberate formaldehyde on heating, and benzaldehyde.

The aldehyde is preferably reacted with the compound of formula (I) in a ratio of from 1:1 to 1:3, preferably from 1:1.2 to 1:3, more preferably from 1:1.5 to 1:3.

Some of the alkalis $M(OH)_x$ (where M is as defined above and represents a non-hydrogen cation and x represents 1 or 2) are not very soluble in an aqueous resin e.g. calcium hydroxide. They can still be used by dehydrating the resin and using the ester as a solvent for the resole. The water insoluble alkali can then be dispersed in the resin to form a paste. A polar solvent (for example water) is then required to start the reaction.

The ester curing agent used to cure the alkaline phenolic resole resin is preferably of formula

$$R^3COOR^4 \quad (III)$$

wherein $R^3$ represents a hydrogen atom or a straight or branched chain alkyl group containing from 1 to 8 carbon atoms (preferably from 1 to 4, more preferably from 1 to 2 carbon atoms) optionally substituted by a halogen atom; and $R^4$ represents a straight or branched chain alkyl group containing from 1 to 8 carbon atoms (preferably from 1 to 4, more preferably from 1 to 2 carbon atoms) optionally substituted by one or more hydroxy and/or $R^3COO-$ groups, or a phenyl group optionally substituted by a straight or branched chain optionally unsaturated alkyl group containing from 1 to 8 carbon atoms (preferably from 1 to 4 carbon atoms, more preferably from 1 to 2 carbon atoms) optionally substituted by a hydroxy group, a halogen atom (preferably chlorine), a hydroxy group, and/or a phenyl or benzyl group (optionally substituted by a hydroxy group and/or a straight or branched chain alkyl group containing from 1 to 8 carbon atoms (preferably from 1 to 4 carbon atoms, more preferably from 1 to 2 carbon atoms)); or $R^3$ represents a chemical bond to $R^4$ and $R^4$ represents a straight or branched chain alkyl group containing from 2 to 10 carbon atoms (preferably from 2 to 4 carbon atoms).

The ester curing agent for the alkaline resole resin must be reactive with the alkali to produce a salt in the cured resin. Reactive esters can include, but are not restricted to, carboxylic acid esters, esters of polyhydric alcohols, lactones and carbonate esters, phenolic esters and resole esters. Examples of reactive carboxylic acid esters are methyl formate and ethyl formate. Examples of reactive polyhydric alcohol esters which may be used as curing agent for the resin include glycerol triacetate and ethylene glycol diacetate. Examples of reactive carbonate esters include cyclic carbonate esters such as propylene carbonate and ethylene carbonate. Examples of reactive lactones include propiolactone, butyrolactone, valerolactone and caprolactone. Examples of reactive phenolic esters are phenyl acetate and resorcinol diacetate. An example of a reactive resole ester is 2,4,6-tris-acetoxymethylphenyl acetate. Mixtures of esters may be used, for example propylene carbonate and triacetin, to vary the rate of cure.

It has been found that the rate of curing of the resole by the ester is determined primarily by the acidity of the conjugate acid, e.g. ethyl formate ($R^3$=H) reacts approximately 1000 times faster than ethyl acetate ($R^3$=CH$_3$) due to the greater acidity of formic acid over acetic acid. The gel times achieved using each ester also exhibit a similar order of difference. The carbon chain length of the alcohol ($R^4$) influences saponification rates and gel times to a lesser extent with the saponification rate reduced and the gel time increased with each additional carbon. It is also been found that as the chain length and/or branching of $R^3$ and $R^4$ increases the miscibility of the resin and ester is reduced. Good compatibility between the ester and resin is essential for the cure reaction to proceed. It is therefore clear that the selection of an ester curing agent will determine the cure rate of the reaction, and will also determine the carboxylate ion formed in the reaction and ultimately the salt contained in the polymer matrix which influence the properties of the electrode.

The base used in the reaction to form the ester-cured salt-containing alkaline phenolic resole resin used in the invention is preferably an alkaline compound which is capable of forming a conducting salt which is soluble in the resin used in the invention. An example of a suitable base is a hydroxide or an oxide of an alkali or alkaline earth metal or of ammonia, e.g. lithium, sodium, potassium, magnesium, calcium, barium or ammonia.

The ester-cured salt-containing alkaline phenolic resole resin used in the invention is preferably prepared from a resole resin, an ester curing agent, one or more bases and, optionally, a polar solvent. Methods for their synthesis are well known to a person of skill in the art and are described in DE-C-1 065 605, DE-C-1 171 606, JP-A 49-16793 and JP-A 50-130627. According to these publications, a highly alkaline phenolic resole resin in aqueous solution may be cured at ambient temperature by reaction with an organic ester by contacting the resin with the ester in the form of a liquid or a gas. The ester-cured alkaline phenolic resole resin containing conducting alkaline salts used in the invention is optionally in dried or in anhydrous form depending on the particular properties required.

An additional feature of ester cured alkaline phenolic resins is that unlike most common thermosetting polymer systems they are aqueous based and dilutable with water. The polymerisation reaction on addition of the ester curing agent to a water diluted resin is unaffected and hardening of the polymer proceeds although at a slower rate. Use of a faster curing ester will however speed up the hardening process to a desirable rate. The main advantage water dilutability imparts to a conducting material-doped ester cured phenolic resin mixture is the ability to wet the carbon or graphite powders or flakes to enable high conductive material content electrode material to be produced and consequently higher conducting electrodes formed from the material. On room temperature curing the added water evaporates from the formed electrode material and a hard, solid, high conductive material, low water, conductive material doped ester cured phenolic polymer results.

A controlled addition of water to the resin/carbon mixture is an important processing feature as the consistency of the mixture can be changed to suit the room temperature injection moulding, pouring or casting techniques employed. At high water additions control of the mixture consistency can be enhanced by the inclusion of a thickener such as a starch or a starch derivative, cellulose or a cellulose derivative, a natural gum such as gum arabic or guar gum or a synthetic thickening agent such as a polyamide or a polyacrylate.

The resin used in the invention optionally includes a plasticiser to increase flexibility of the resin. It will be appreciated that for some applications a flexible resin would be useful. The plasticiser is preferably inert, alkali compatible, non-volatile, and/or liquid. Preferably the plasticiser is soluble in the resin and/or the ester curing agent. Levels of plasticiser are determined by the application requirements and are limited by effects on conductivity of the cured electrode material. Examples of the plasticiser include an excess of the ester curing agent, polyvinylacetate and/or a polyethylene glycol.

Ester cured phenolic resins may be foamed by employing a foam blowing agent in the resin formulation to form a 3-d porous structure. Examples of foam blowing agents can include any low boiling solvent of low water miscibility such as trichloromonofluoromethane (CFC-11), hydrogenated chlorofluorocarbons (called "HCFCs), partially hydrogenated fluorocarbons (called "HFCs"), hydrocarbons such as iso-pentane and cyclopentane. The use of blowing agents in this application is not to produce insulating foam but only to form a 3-d open cell structure. Therefore blowing agents are lost during the curing stage and can be recovered and recycled after formation of the 3-d structure. Other blowing agents such as carbon dioxide and nitrogen can be employed.

The invention is illustrated by reference to the following Figures of the drawings in which FIGS. 1 and 2 show results from tests using a cell according to the invention having an electrode in the form of a rotating cylinder:

Figure 7:
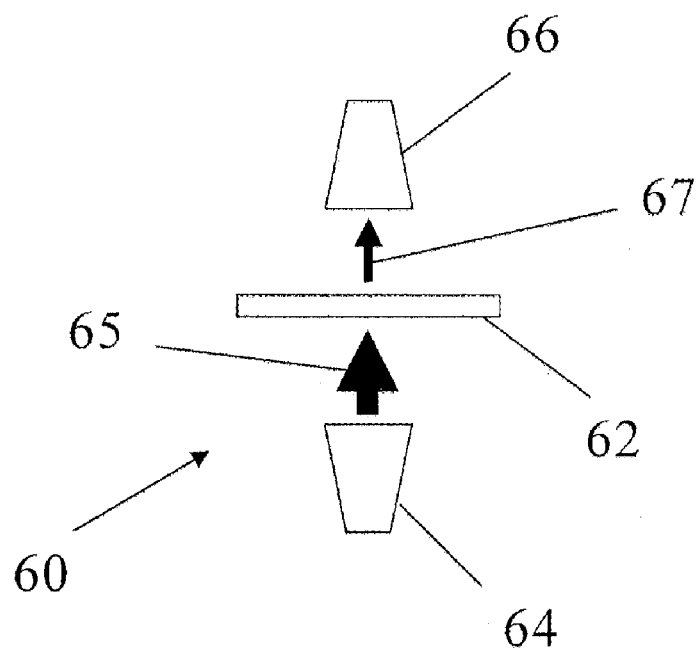
FIG. 7 is a schematic drawing of test apparatus used to measure transmission of electromagnetic radiation through a test sample.
Figure 8:
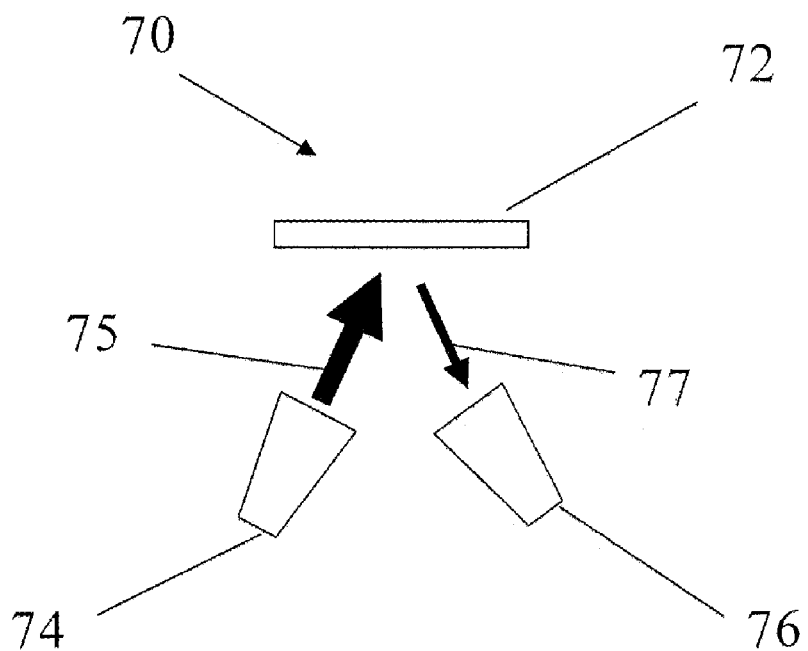
FIG. 8 is a schematic drawing of test apparatus used to test reflection of electromagnetic radiation by a test sample.
Figure 9:
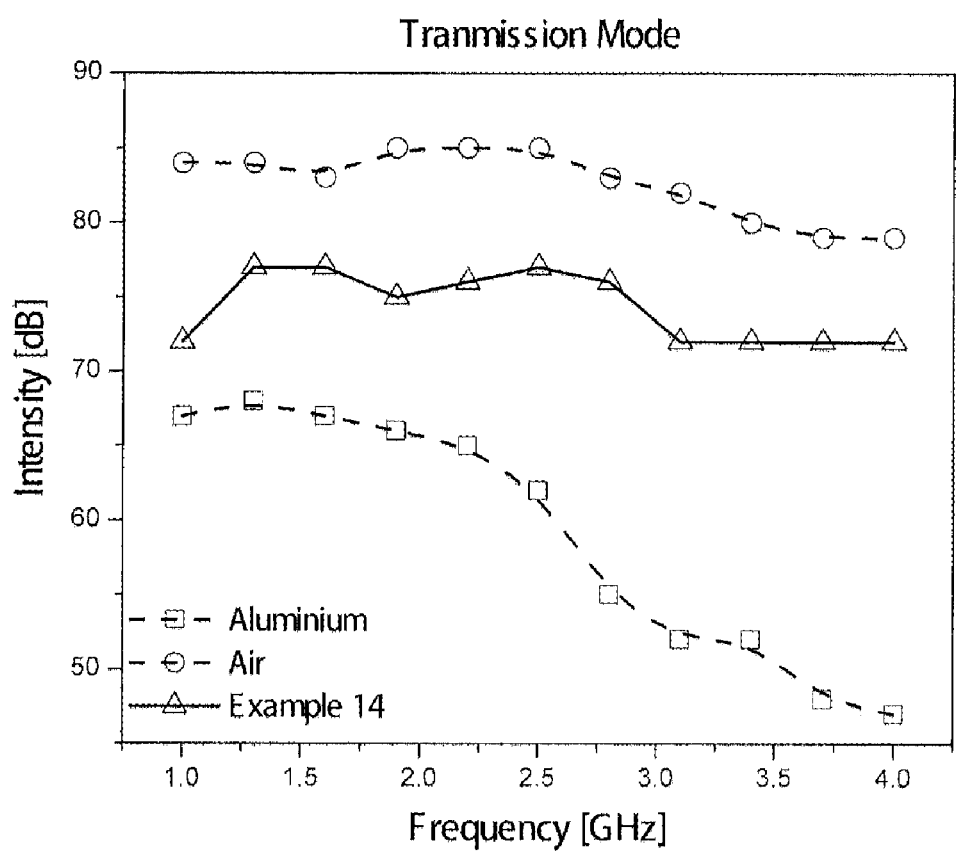
Figure 10:
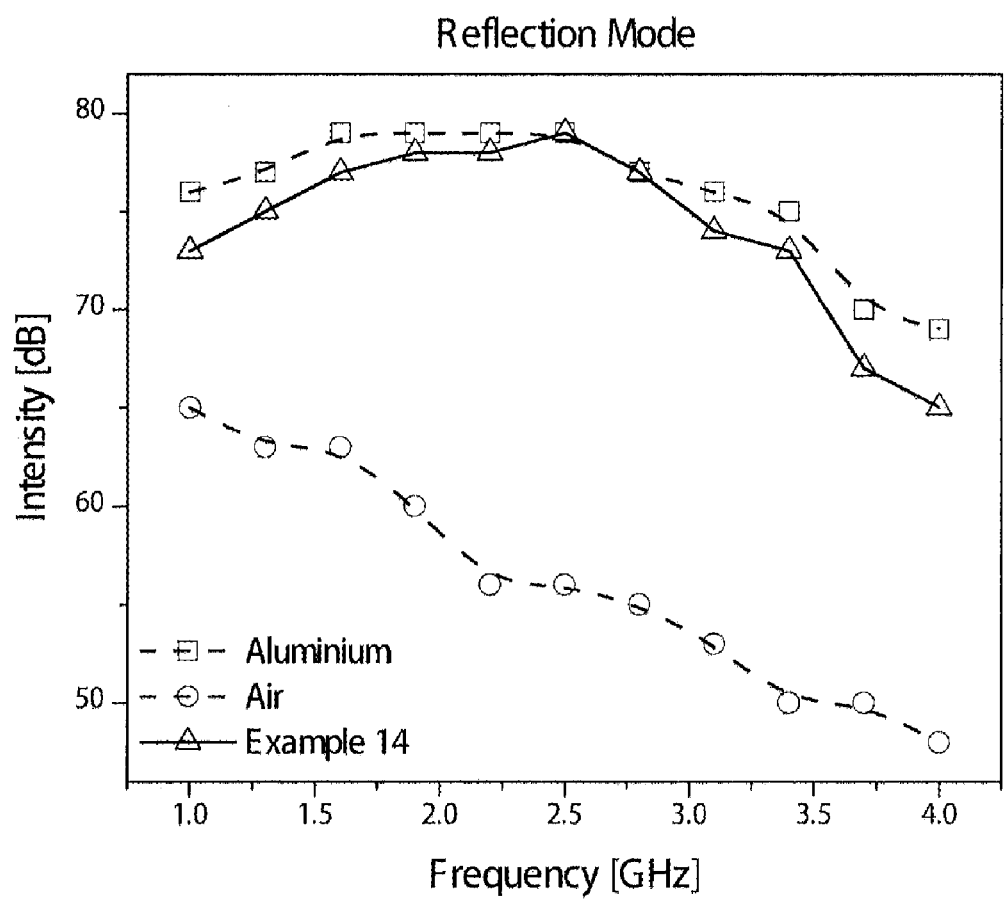

FIG. 9 shows data from Examples 14 in graphical form wherein the vertical y axis has a scale measuring the intensity in units of dB of transmitted radiation measured using the test apparatus shown in FIG. 7 and the horizontal x axis has a scale measuring frequency in GHz. The data points for Example 14 are indicated by triangles (Δ). The data points for first reference material aluminium are indicated by squares (□) and the data points for second reference material air are indicated by circles (○); and FIG. 10 shows data from Examples 14 in graphical form wherein the vertical y axis has a scale measuring the intensity in units of dB of reflected radiation measured using the test apparatus shown in FIG. 8 and the horizontal x axis has a scale measuring frequency in GHz. The data points for Example 14 are indicated by triangles (Δ). The data points for the first reference material aluminium are indicated by squares (□) and the data points for the second reference material air are indicated by circles (○).

Figure 3:
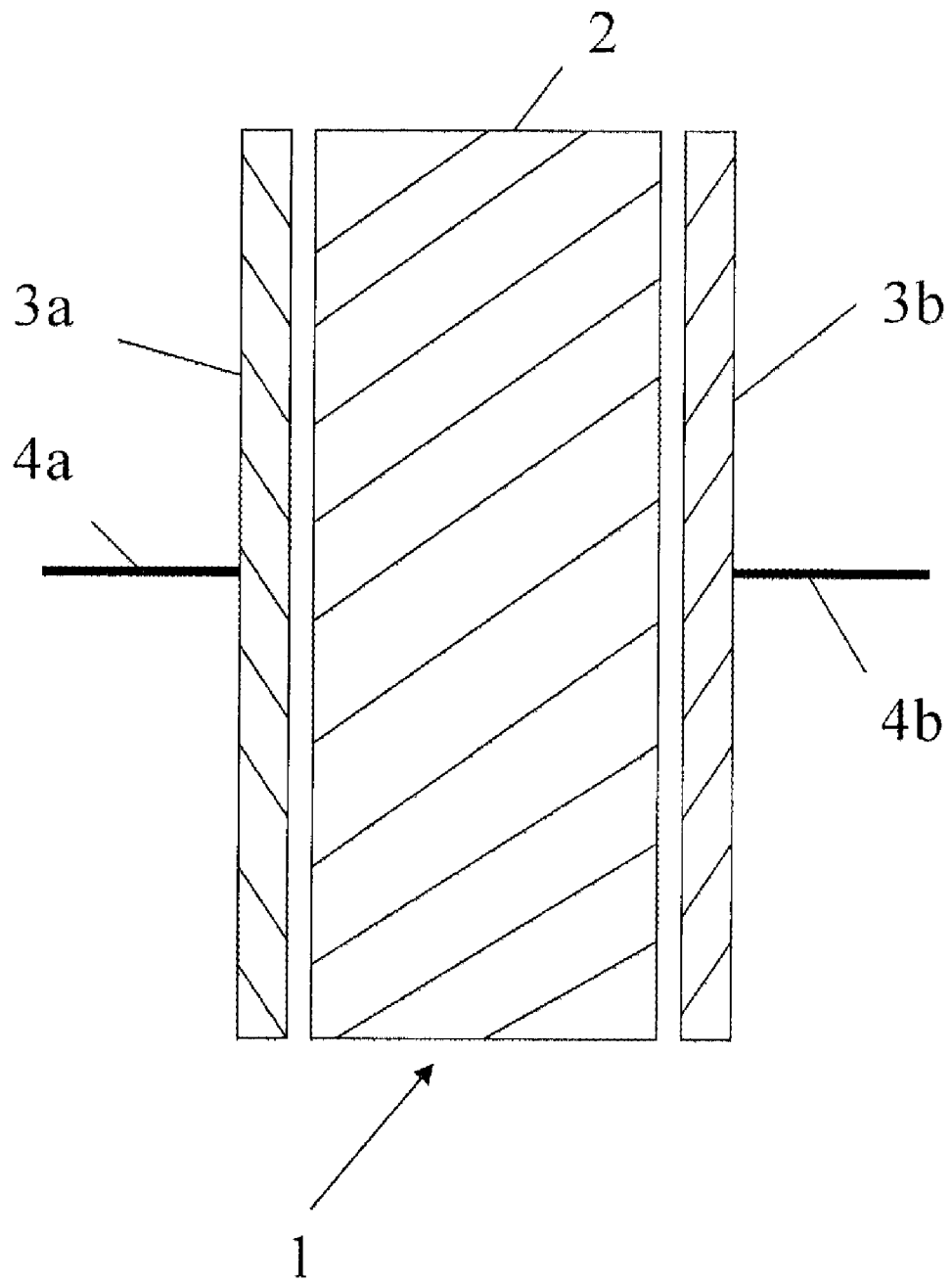
FIG. 3 is a schematic cross-section of a first embodiment of an electrical device according to the invention.

FIG. 3 shows an electrical device 1 which has a block of electrolyte 2 with asymmetric electrodes 3a,3b at each side of it. The asymmetric electrodes are each provided with electrical connectors 4a,4b. The electrodes are asymmetric electrodes in that one acts as a cathode and the other acts as an anode. The asymmetric electrodes are formed from a resin prepared, for example, according to Example 2.

Figure 4:
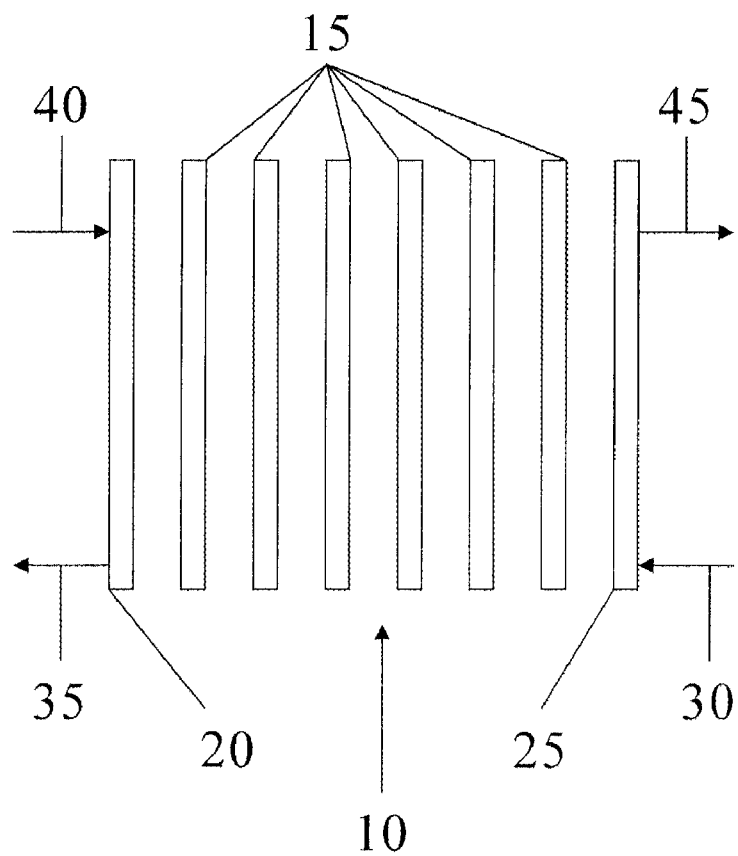
FIG. 4 is a schematic plan view of a second embodiment of an electrical device according to the invention.
Figure 5:
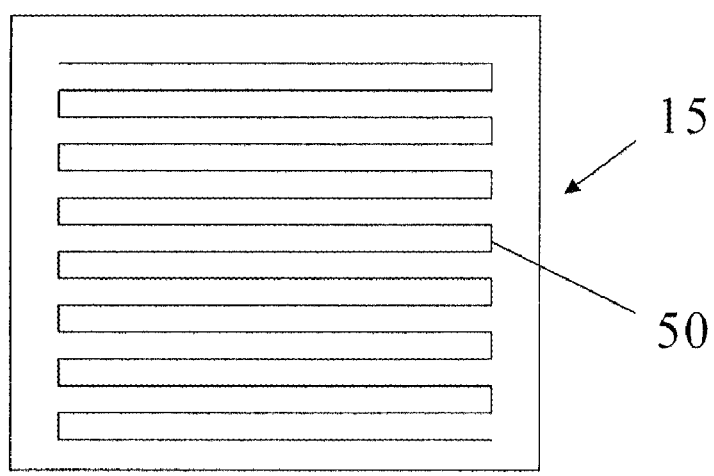
FIG. 5 is a schematic plan view of a bipolar plate according to the invention.

FIG. 4 shows an electrical device, for example, in the form of a fuel cell 10 having a hydrogen inlet 30 and outlet 35 and an oxygen inlet 40 and outlet 45. The example fuel cell 10 has electrodes 20,25 and bipolar plates 15. A bipolar plate 15 is shown in more detail in FIG. 5 as having grooves 50 on its surface. The reverse face of the plate 15 also has grooves 50. A variant of the bipolar plate 15 is a separator plate which has grooves 50 on one face only.

The following examples illustrate how to prepare an electrode for use in the invention. The benefits of the invention are also demonstrated. In these examples the materials used are a conventional alkaline phenolic resole (resin A), a neutral resole resin (B), butyrolactone (ester), triacetin (ester), and graphite, nickel powder and copper powder (conductivity promoters).

EXAMPLE 1

This example describes preparation of an alkaline phenol-formaldehyde resin with a formaldehyde to phenol molar ratio of 2.0:1 and a sodium hydroxide to phenol molar ratio of 0.65:1. Phenol (5.0 mol) and sodium hydroxide (0.1 mol) were charged to a reaction vessel and the temperature maintained at 65° C. whilst 50% formalin (3.0 mol) was added. The temperature was allowed to be raised to 80° C. and maintained at 80° C. while a second charge of 50% formalin (7.0 mol) was added slowly over 30 minutes. The mixture was then held at 80° C. for 60 minutes before 50% sodium hydroxide solution (3.15 mol) was charged maintaining temperature at 80° C. The resin was condensed at 80° C. to a viscosity of 400 cP.

EXAMPLE 2

A carbon doped ester-cured resole resin for use as an electrode was prepared by mixing 50 g of resin A with 100 g of graphite, 50 g water and 10 g of butyrolactone in a paper cup. Part of the mixture was poured into a latex mould and allowed to harden. A gel time was recorded from the mixture left in the cup.

EXAMPLE 3

The cast specimen obtained from Example 2 was allowed to stand at room temperature over 24 hours before conductivity measurements were made using a Como DT3800 Digital Multimeter. The resistance of the specimen was measured at 9 Ohms cm at 20° C.

EXAMPLE 4

This example demonstrates how the resin prepared in Example 2 functions as an electrode material for efficient recovery of metal ions from solution. The resin was made into a cylinder and by the use of silver epoxy resin was secured to a Rotating Disc Electrode to produce a Rotating Cylinder Electrode, RCE.

This RCE was then used for various experiments, mainly to suggest how efficient the electrode material would be under test conditions. Firstly, the electrode was used to obtain a current—potential curve for the deposition of a 1 mmol $Cu^{2+}$ and $Cd^{2+}$ in 0.5 M $Na_2SO_4$ at pH 2. The results are shown in FIG. 1.

Figure 1:
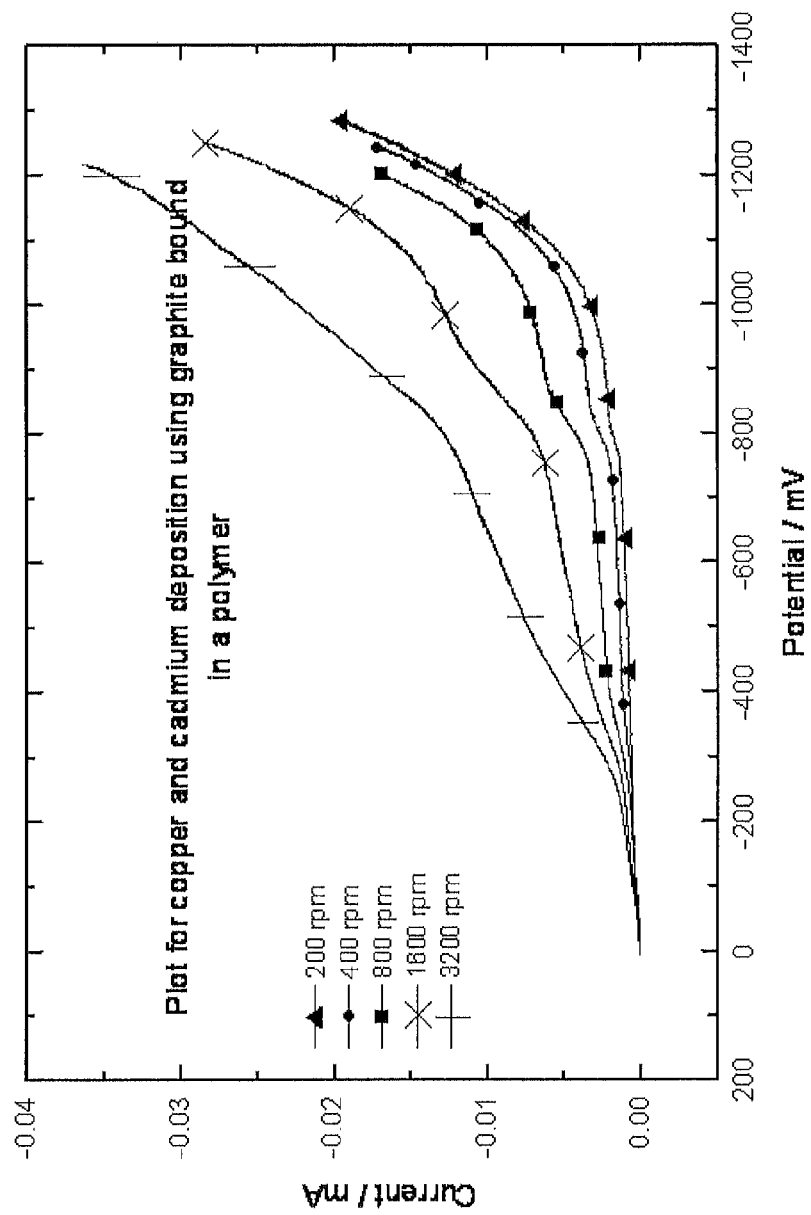
FIG. 1 shows a plot for copper and cadmium deposition at different revolution rates for the rotating cylinder.

In FIG. 1, five curves are shown which give the results for five different rates of rotation. The rates of rotation for each curve in order are as follows. The first curve (which is the lowest on the graph and which reaches a peak of −0.02 mA) was measured at 200 rpm; the second curve was measured at 400 rpm; the third curve was measured at 800 rpm; the fourth curve was measured at 1600 rpm; and the fifth curve was measured at 3200 rpm.

Each curve shows the change in current as the potential is varied. In this scan, the potential is swept (at 1 $mVs^{-1}$) and the current is recorded. The magnitude of the current depends on the process that is occurring, in this case copper and cadmium deposition. The initial curve (in the range of from −150 to −750 mV) is caused by the deposition of copper on the electrodes surface, from −750 to −1050 mV Cadmium has begun to deposit and after −1050 mV hydrogen evolution (as a secondary process) has commenced.

From FIG. 1, it is clear that the resin according to Example 2 is functioning as an electrode as copper and cadmium is being removed from the mixed solution.

EXAMPLE 5

In this Example, the electrode of Example 2 was used to collect copper from a solution over a period of 2 hours, and at intervals samples were taken to analyse the amount of copper within the solution.

Figure 2:
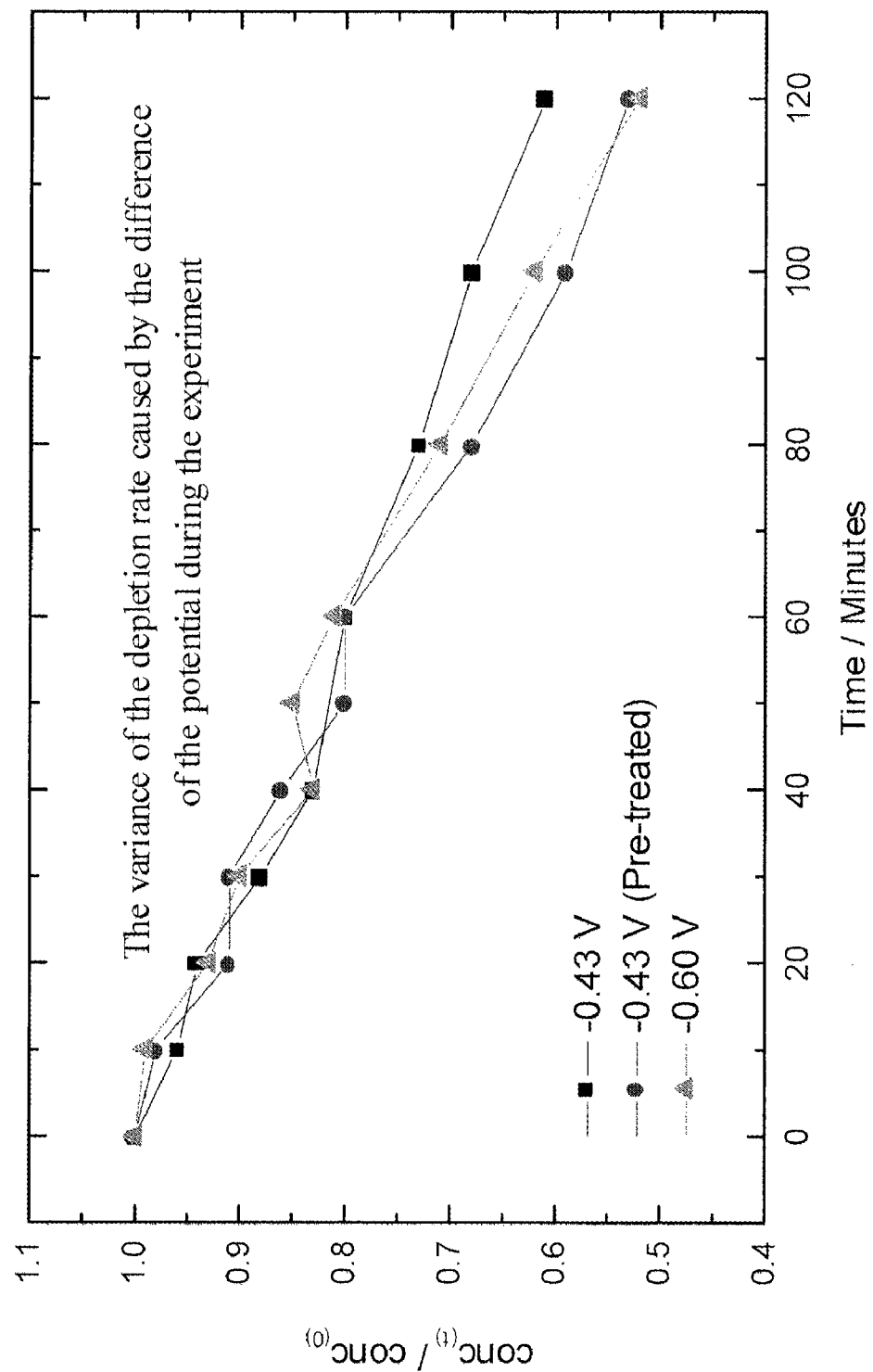
FIG. 2 shows the variation in depletion rate at different potentials.

Firstly from FIG. 2, as the potential is increased during the experiment the rate at which the copper is removed from the solution increases, as expected. Also, for the same potential (−0.43 V), if the electrode is already covered in copper (pre-treated), the rate at which the copper is removed also increases to a similar rate to that when the experiment is ran at −0.60 V. It is shown that either by pre-treating the electrode or increasing the potential during the experiment increases the rate of removal by an extra 10 percent. Over a 2 hour period, the amount of copper removed is just under 50%.

These results suggest that the polymer material can be used for metal ion removal from water.

EXAMPLE 6

Carbon doped ester cured phenolic resin electrode material was prepared from carbon graphite grades of varying particle size distribution.

Sample A—100 g of Graphite grade KL96/97, a 96-97% Carbon flake graphite ground to a d50 of 20-25 microns from Branwell, UK, was mixed with 40 g resin (from example 1), 75 g of water, 0.6 g guar gum thickener and 8 g triacetin curing agent. The mixture was mixed in a Kenwood Chef for 2 minutes then poured into 10 ml cylindrical moulds and allowed to harden at room temperature. After 15 minutes the specimens were removed from the moulds. Resistivity measurements commenced 1 hour after release from the mould and continued over the next few days.

Sample B—As A using coarser grade of graphite grade 2300 d50 36-42 microns

Sample C—As A using flake grade graphite KFL96/97, a "small flake" which typically has some 35-40%>100 microns and 40%<75 microns, i.e. a mean particle size around 80-90 microns.

TABLE 1

| Time (hours) after release from mould | Resistance Ohms cm | | |
|---|---|---|---|
| | A | B | C |
| 0 | 1200 | 1000 | 5500 |
| 3 | 180 | 117 | 120 |
| 6 | 57 | 34 | 62 |
| 24 | 19 | 23 | 13 |
| 48 | 7 | 11 | 8 |
| 72 | 5 | 9 | 7 |

Table 1 shows that all samples give a high initial resistance and that as curing proceeds the resistance drops rapidly over the next few hours reaching <10 Ohms cm.

EXAMPLE 7

Carbon doped ester cured phenolic resin electrode material was prepared from carbon graphite mixed with other conductive fillers.

Sample D—40 g of graphite grade 2300 from Branwell, UK, was mixed 80 g of Copper particles and added to 20 g resin (from example 1). 4 g triacetin curing agent was added and the mixture mixed in a cup for 2 minutes then poured into 10 ml cylindrical mould and allowed to harden at room temperature. After 15 minutes the specimens were removed from the moulds. Resistivity measurements commenced 1 hour after release from the mould and continued over the next few days.

Sample E—As D using Nickel particles 36-42 microns

TABLE 2

| Time after release from mould | Resistance Ohms cm | |
|---|---|---|
| | D | E |
| 0 | 1200 | 1000 |
| 3 | 70 | 120 |
| 6 | 61 | 83 |
| 24 | 40 | 25 |
| 48 | 21 | 15 |
| 72 | 14 | 12 |

Table 2 shows that all samples give a high initial resistance and that as curing proceeds the resistance drops rapidly over the next few hours reaching <20 Ohms cm.

EXAMPLE 8

Preparation of Carbon-Doped Ester Cured Phenolic 3-d Foam Structure

A carbon-doped ester cured phenolic 3d structure was prepared by pre-mixing 50 parts phenolic foam resin IDP292 supplied by Borden Chemical UK Ltd with 2 parts DC193 silicone oil supplied by Dow Corning. 100 parts KL96/97 graphite powder and 50 parts water were then mixed with the resin until a smooth blend is achieved. Using a high-speed laboratory mixer 10 parts of HCFC141b blowing agent was mixed into the resin blend to give a smooth emulsion. To start the reaction 15 parts of butyrolactone curing agent was mixed into the emulsion using the high-speed mixer. After 10 seconds mixing the foam mixture was transferred to a plastic mould and immediately placed in an oven at 50° C. where the foam was allowed to rise and left to harden overnight. On cutting the foam an open cell, fine foam structure of density 265 kg m$^{-3}$ was measured. A resistance of 1 KOhms cm was measured after 24 hours.

EXAMPLE 9

Resin B

Preparation of a Neutral Resole

Phenol (1 mol) and sodium hydroxide (0.004 mol) were charged to a reaction vessel and the temperature maintained at 50° C. whilst 50% formalin (0.6 mol) was added. The temperature was then raised to 80° C. The temperature was maintained at 80° C. as a second charge of 50% formalin (1.0 mol) was added slowly over 30 minutes. The mixture was then held at 80° C. for a further 45 minutes. The pH was adjusted with p-toluene sulphonic acid solution to 6.0+/−0.2. The resin was cooled to 60° C. and then dehydrated by vacuum distillation until a viscosity of 200 cP was reached. The resulting resin had a resin solids content of 72%.

EXAMPLE 10

An ester-cured resole resin for use as an electrolyte was prepared by mixing 50 g of resin A with 10 g of butyrolactone in a paper cup. Part of the mixture was poured into a latex mould and allowed to harden. A gel time was recorded from the mixture left in the cup.

EXAMPLE 11

In example 11 50 g of resin B was cooled to below 10° C. (to prevent exotherm) and mixed with 2 g of acid The cast specimens obtained from Examples 10 and 11 were allowed to stand at room temperature over 24 hours before resistance measurements were made using a Como DT3800 Digital Multimeter.

The resistance results are shown in Table 3.

TABLE 3

Resistivity measurements at 20° C. on unfilled cast specimens prepared in Examples 10 and 11

| Example | Resistance |
| --- | --- |
| 10 | 8.1 KOhms cm |
| 11 | >20 MOhms cm |

Examples 10 and 11 illustrate the conductivity induced by the formation of the alkali metal salts in the ester cured phenolic resole reaction (example 10) compared to the acid cured resole composition (example 11).

EXAMPLE 12

100 g of Graphite grade 2369, a 98% Carbon flake graphite ground to 80% minimum >180 microns from Branwell, UK, was mixed with 50 g resin A and 10 g triacetin curing agent. The mixture was mixed in a Kenwood Chef for 2 minutes then poured into 20 ml cylindrical moulds and pressed using a hydraulic press, released from the mould and allowed to harden at room temperature. Specimens were prepared under a range of pressures. Resistivity measurements commenced 24 hour after release from the mould.

TABLE 4

Resistivity measurements at 20° C. on specimens prepared in Example 12 under a range of pressures

| Pressure (psi) | Resistance (ohms cm) |
| --- | --- |
| 0 | 1.30 |
| 20 | 0.29 |
| 40 | 0.15 |

EXAMPLE 13

This example demonstrates how the ester cured phenolic bonded carbon electrode composition prepared in example 2 functions as an electrode material, in this case as an anode. This would be useful, for example, in the reduction of $Cl^-$ ion to chlorine gas.

The electrode composition was moulded into a cylinder and polarised anodically in saturated brine solution for 65 hours at a constant current of 50 mA $cm^{-2}$. The weight of the anode at commencement of the polarisation was 12.5 g. After 65 hours the weight was measured at 12.8 g indicating good anode stability.

Figure 6:
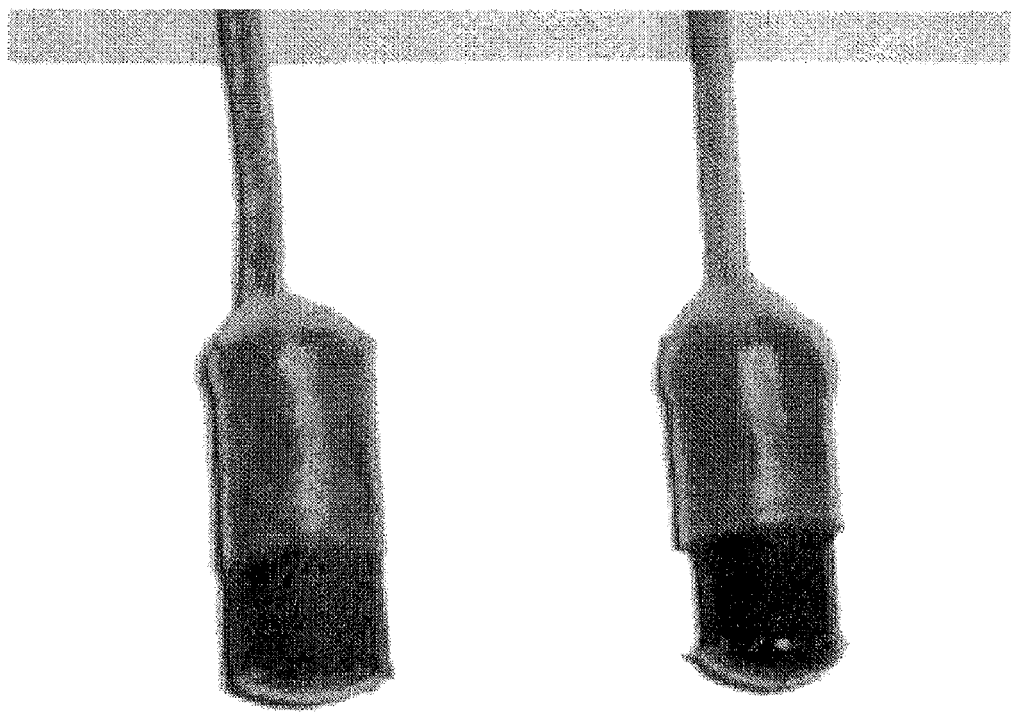
FIG. 6 is a photograph showing the pronounced wear of a graphite rod anode (shown on the right) compared to an ester cured phenolic bonded carbon anode (shown on the left), after 65 hours polarised in brine.

A standard graphite rod was polarised anodically in saturated brine over the same period and was found to have eroded significantly compared to the ester cured phenolic bonded carbon electrode. This is shown by comparing the size of the electrodes depicted in FIG. 6. In FIG. 6, the electrode on the right is a standard graphite rod after 65 hours of polarisation treatment. It can be seen that it is significantly smaller than the electrode prepared according to the invention shown on the left which has also been subjected to 65 hours of polarisation treatment.

FURTHER DESCRIPTION OF FIGURES

FIG. 7 shows a test apparatus 60 for measuring measure transmission of electromagnetic radiation through a test sample 62. Test sample 62 is a free standing sheet of aluminium having measurements 500 mm×500 mm×3 mm (length×breadth×height) or of a resin prepared as described in Example 14 having measurements 500 mm×500 mm×10 mm. The test apparatus 60 further comprises an electromagnetic radiation (EMR) generator 64 which is capable of generating electromagnetic radiation having a frequency of from 1 to 4 GHz in a direction indicated by arrow 65, and an EMR detector 66 which is capable of detecting electromagnetic radiation having a frequency of from 1 to 4 GHz in a direction indicated by arrow 67. The EMR generator 64 and EMR detector 66 are arranged to oppose each other on either side of largest faces of test sample 62.

FIG. 8 shows a test apparatus 70 for measuring measure reflection of electromagnetic radiation by a test sample 72. Test sample 72 is a free standing sheet of aluminium or of a resin prepared as described in Example 14 having measurements 500 mm×500 mm×10 mm (length×breadth×height). The test apparatus 70 further comprises an EMR generator 74 which is capable of generating electromagnetic radiation having a frequency of from 1 to 4 GHz in a direction indicated by arrow 75, and an EMR detector 76 which is capable of detecting electromagnetic radiation having a frequency of from 1 to 4 GHz in a direction indicated by arrow 77. The EMR generator 74 and EMR detector 76 are arranged at an angle on the same side of one of the largest faces of test sample 62.

EXAMPLE 14

This example describes the preparation of an alkaline phenol-formaldehyde resin with a formaldehyde to phenol molar ratio of 2.0:1 and a sodium hydroxide to phenol molar ratio of 0.65:1. Phenol (5.0 mol) and sodium hydroxide (0.1 mol) were charged to a reaction vessel and the temperature maintained at 65° C. whilst 50% by weight formalin (3.0 mol) was added. The temperature was raised to 80° C. and maintained at 80° C. while a second charge of 50% formalin (7.0 mol) was added slowly over 30 minutes. The mixture was then held at 80° C. for 60 minutes before 50% by weight sodium hydroxide solution (3.15 mol) was charged maintaining temperature at 80° C. The resin was condensed at 80° C. to a viscosity of 400 cP. Two pre-blended esters were utilised to cure the resin—propylene glycol diacetate (PGDA) and triacetin were mixed at a weight ratio of 3.3:1 (PGDA:triacetin). This combined hardening agent was added to the resin at a weight ratio of 5:1. The resin solution was mixed, poured into a cast and cured under ambient conditions.

The cured cast was used as a test sample 62,72 in test apparatuses 60,70, respectively, as shown in FIGS. 7 and 8 to determine its transmission/reflection of electromagnetic radiation compared to air and to aluminium. The results obtained are shown in FIGS. 9 and 10 from which it can surprisingly be seen that the resin of Example 14 displays significant attenuation of incident EMR across the frequency range and has a reflectivity response close to that of aluminium.

Thus it is clear that an ester-cured alkaline phenolic resole resin containing conducting alkaline salts is effective in a method of electromagnetically shielding a location which method comprises a step of shielding the location with the resin. Similarly, it is expected on the basis of this data that an ester-cured alkaline phenolic resole resin containing conducting alkaline salts will be effective in a method of suppressing electromagnetic interference in an electronic product which method comprises a step of applying an effective amount of resin to the electronic product.

While various embodiments of conductive polymers, conductive polymer compositions and methods for using the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. An electrolyte comprising an ester-cured alkaline phenolic resole resin containing conducting alkaline salts.

2. An electrolyte as defined in claim 1, wherein the ester-cured alkaline phenolic resole resin containing conducting alkaline salts is a reaction product of an ester curing agent with an phenolic resole and a base.

3. An electrolyte as defined in claim 2, wherein the phenolic resole is a reaction product of a phenol-reactive aldehyde with an alkaline compound of formula

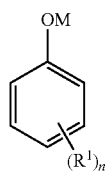

(I)

wherein $R^1$ is a straight or branched chain optionally unsaturated alkyl group containing from 1 to 8 carbon atoms optionally substituted by a halogen atom or a hydroxy group, a halogen atom, a hydroxy group, and/or a phenyl or benzyl group;

M is a mixture of hydrogen ions and at least one further cation wherein the molar ratio of hydrogen ions to the at least one further cation is sufficient for the pH to be greater than 7; and n is from 0 to 2.

4. An electrolyte as defined in claim 3, wherein the phenol-reactive aldehyde is a compound of formula

RCHO     (II)

wherein R represents hydrogen atom or a straight or branched chain alkyl group having from 1 to 8 carbon atoms; or a precursor of a compound of formula (II).

5. An electrolyte as defined in claim 3, wherein the phenol-reactive aldehyde is reacted with the compound of formula (I) in a ratio of from 1:1 to 1:3.

6. An electrolyte as defined in claim 2, wherein the ester curing agent is of formula $R^3COOR^4$     (III)

wherein $R^3$ represents a hydrogen atom or a straight or branched chain alkyl group containing from 1 to 8 carbon atoms optionally substituted by a halogen atom; and $R^4$ represents a straight or branched chain alkyl group containing from 1 to 8 carbon atoms optionally substituted by one or more hydroxy and/or $R^3COO^-$ groups, or a phenyl group optionally substituted by a straight or branched chain optionally unsaturated alkyl group containing from 1 to 8 carbon atoms optionally substituted by a hydroxy group, a halogen atom, a hydroxy group, and/or a phenyl or benzyl group (optionally substituted by a hydroxy group and/or a straight or branched chain alkyl group containing from 1 to 8 carbon atoms); or $R^3$ represents a chemical bond to $R^4$ and $R^4$ represents a straight or branched chain alkyl group containing from 2 to 10 carbon atoms.

7. An electrolyte as defined in claim 1, wherein the resin includes a plasticiser to increase flexibility of the resin.

8. An electrical device, comprising:
two asymmetric electrodes; and
an electrolyte comprising an ester-cured alkaline phenolic resole resin containing conducting alkaline salts.

9. An electrical device as defined in claim 8, wherein the device is a cell.

10. An electrical device as defined in claim 8, wherein the device is a battery including two or more cells.

11. An electrical device as defined in claim 8, wherein the device is a capacitor.

12. A method of electromagnetically shielding a location, the method comprising the step of:
shielding the location with an ester-cured alkaline phenolic resole resin containing conducting alkaline salts.

13. A method as defined in claim 12, wherein the resin is foamed.

14. A method of preventing electrostatic discharge at a location, the method comprising the step of:
applying an effective amount of an ester-cured alkaline phenolic resole resin containing conducting alkaline salts to the location.

15. A method as defined in claim 14, wherein the resin is foamed.

16. A method of suppressing electromagnetic interference in an electronic product, the method comprising the step of:
applying an effective amount of an ester-cured alkaline phenolic resole resin containing conducting alkaline salts to the electronic product.

17. A method as claimed in claim 16, wherein the method further comprises the step of:
constructing a housing for the product wherein the housing is constructed at least partially from the ester-cured alkaline phenolic resole resin containing conducting alkaline salts.

18. A method as defined in claim 16, wherein the resin is foamed.

* * * * *